United States Patent [19]

Wang

[11] Patent Number: 5,956,746
[45] Date of Patent: Sep. 21, 1999

[54] COMPUTER SYSTEM HAVING TAG INFORMATION IN A PROCESSOR AND CACHE MEMORY

[75] Inventor: Wen-Hann Wang, Portland, Oreg.

[73] Assignee: Intel Corporation, Santa Clara, Calif.

[21] Appl. No.: 08/910,695

[22] Filed: Aug. 13, 1997

[51] Int. Cl.[6] .............................. G06F 12/00; G06F 13/14
[52] U.S. Cl. ........................... 711/137; 711/204; 711/122
[58] Field of Search ..................................... 711/137, 204, 711/118, 122

[56]     References Cited

U.S. PATENT DOCUMENTS

| 5,148,538 | 9/1992 | Celtruda et al. | 711/205 |
| 5,515,518 | 5/1996 | Stiles et al. | 395/586 |
| 5,548,742 | 8/1996 | Wang et al. | 711/128 |
| 5,617,347 | 4/1997 | Lauritzen | 365/49 |
| 5,737,746 | 4/1998 | Hardin et al. | 711/118 |
| 5,740,399 | 4/1998 | Mayfield et al. | 711/137 |
| 5,778,436 | 7/1998 | Kedem et al. | 711/137 |
| 5,829,026 | 10/1998 | Leung et al. | 711/122 |
| 5,832,534 | 11/1998 | Singh et al. | |
| 5,835,947 | 11/1998 | Cherabuddi | 711/125 |
| 5,860,104 | 1/1999 | Witt et al. | 711/137 |
| 5,893,142 | 4/1999 | Moyer et al. | 711/125 |

*Primary Examiner*—John W. Cabeca
*Assistant Examiner*—Christopher S. Chow
*Attorney, Agent, or Firm*—Alan K. Aldous

[57]     ABSTRACT

The present invention includes a computer system having an on-processor predictor tag array, an off-processor cache memory, and comparison circuitry. The on-processor predictor tag array contains first portions of tag information for multiple ways and multiple sets. The off-processor cache memory includes memory locations to store data and second portions of tag information. The comparison circuitry makes a first comparison of a first portion of an address with the first portions of tag information for the ways of one of the sets and uses results of the first comparison in predicting which of the ways, if any, correspond to the address. The comparison circuitry also makes a second comparison of the second portion of the address with sections of the second portions of tag information identified by the predicted way and the address.

21 Claims, 4 Drawing Sheets

000# COMPUTER SYSTEM HAVING TAG INFORMATION IN A PROCESSOR AND CACHE MEMORY

BACKGROUND OF THE INVENTION

1. Technical Field of the Invention

The present invention relates to computer caches and more particularly to a computer system in which tag information is distributed between a processor and cache memory.

2. Background Art

Caches are used to bridge the gap between fast processor cycle time and slow memory access time. Given a fixed size, the performance of an L2 cache is mainly determined by three factors: latency, set-associativity, and bandwidth (or burst rate). Of the three, bandwidth plays a particularly important role. As used herein, an L2 cache is a cache that is off the processor. Unfortunately, the best known low-cost L2 cache methods fail to adequately address the bandwidth problem. In an L2 cache having only two 32-bit wide burst static random access memory (BSRAM or burst SRAM) components, the L2 caches require four data bus bursts to provide a 32-byte cache line to the processor. When the processor operates at twice the speed of the L2 cache data bus, this translates into eight processor cycles during which no other request can use the L2 data bus, resulting in suboptimal performance. This bandwidth situation will get worse as processor speed increases at a faster rate than the inter-chip I/O speed. The bandwidth problem can be solved in part by doubling the data bus width. However, this requires more pins and therefore is not a low-cost solution.

Another potential roadblock toward a successful low-cost L2 cache solution is rampability (i.e., the ability to produce a product in sufficient quantity at a reasonably price). For example, an L2 cache of the Pentium® Pro processor manufactured by Intel Corporation involves two types of components: tag random access memory (RAM) and BSRAM components. Tag RAM is a cache directory memory that contains a listing of all the memory addresses that have copies stored in cache memory. Each cache location has a corresponding entry in the cache directory. The contents of the directory are compared to the memory address from the processor to determine if a copy of the requested data is contained in cache memory, saving accessing the data from slower main memory. For example, referring to FIG. 1, a cache memory array 10 includes two 32-bit commodity BSRAM components 14 and 16 and a tag RAM component 18.

Commodity BSRAM based L2 solutions fall into two categories: serial tag RAM solutions and parallel tag RAM solutions. Serial tag RAM solutions provide a large set-associativity, while parallel tag RAM solutions provide shorter latency. Both approaches suffer from a common performance bottleneck: an insufficient amount of bandwidth, particularly when the L2 cache bus cannot be operated at the full processor speed.

In order to ramp a microprocessor such as the Intel Pentium® Pro processor, both tag RAM and BSRAM components need to be available in large volume at the same time and at commodity prices. The memory industry needs to design two parts, test two parts, and manage production for two different parts. Original equipment manufacturers (OEMs) need to qualify two parts and manage the purchase and inventory of the two parts. Any surprise in volume, timing, or quality of either of the two components would pose a significant risk in the ability to ramp processors.

Accordingly, there is a need for cache memory that addresses both bandwidth and rampability problems.

SUMMARY OF THE INVENTION

The present invention includes a computer system having an on-processor predictor tag array, an off-processor cache memory, and comparison circuitry. The on-processor predictor tag array contains first portions of tag information for multiple ways and multiple sets. The off-processor cache memory includes memory locations to store data and second portions of tag information. The comparison circuitry makes a first comparison of a first portion of an address with the first portions of tag information for the ways of one of the sets and uses results of the first comparison in predicting which of the ways, if any, correspond to the address. The comparison circuitry also makes a second comparison of the second portion of the address with sections of the second portions of tag information identified by the predicted way and the address.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

Figure 2:
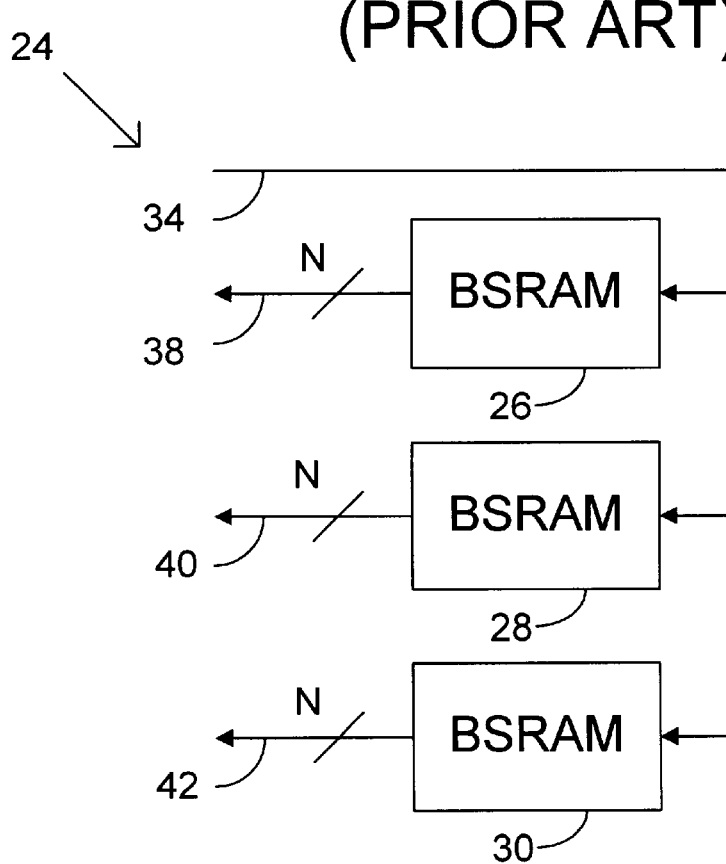
FIG. 2 is a block diagram representation of a cache memory array according to the present invention that employs three commodity BSRAM components, but no tag RAM component.

Referring to FIG. 2, a cache memory array 24 includes three commodity BSRAM components 26, 28, and 30 that receive addresses on conductors 34 and receive and provide data on N-bit wide conductors 38, 40, and 42 respectively. As an example, BSRAM components 26, 28, and 30 may be 32-bit data components that may include 4 additional error correction code bits (sometimes called parity bits).

Figure 3:
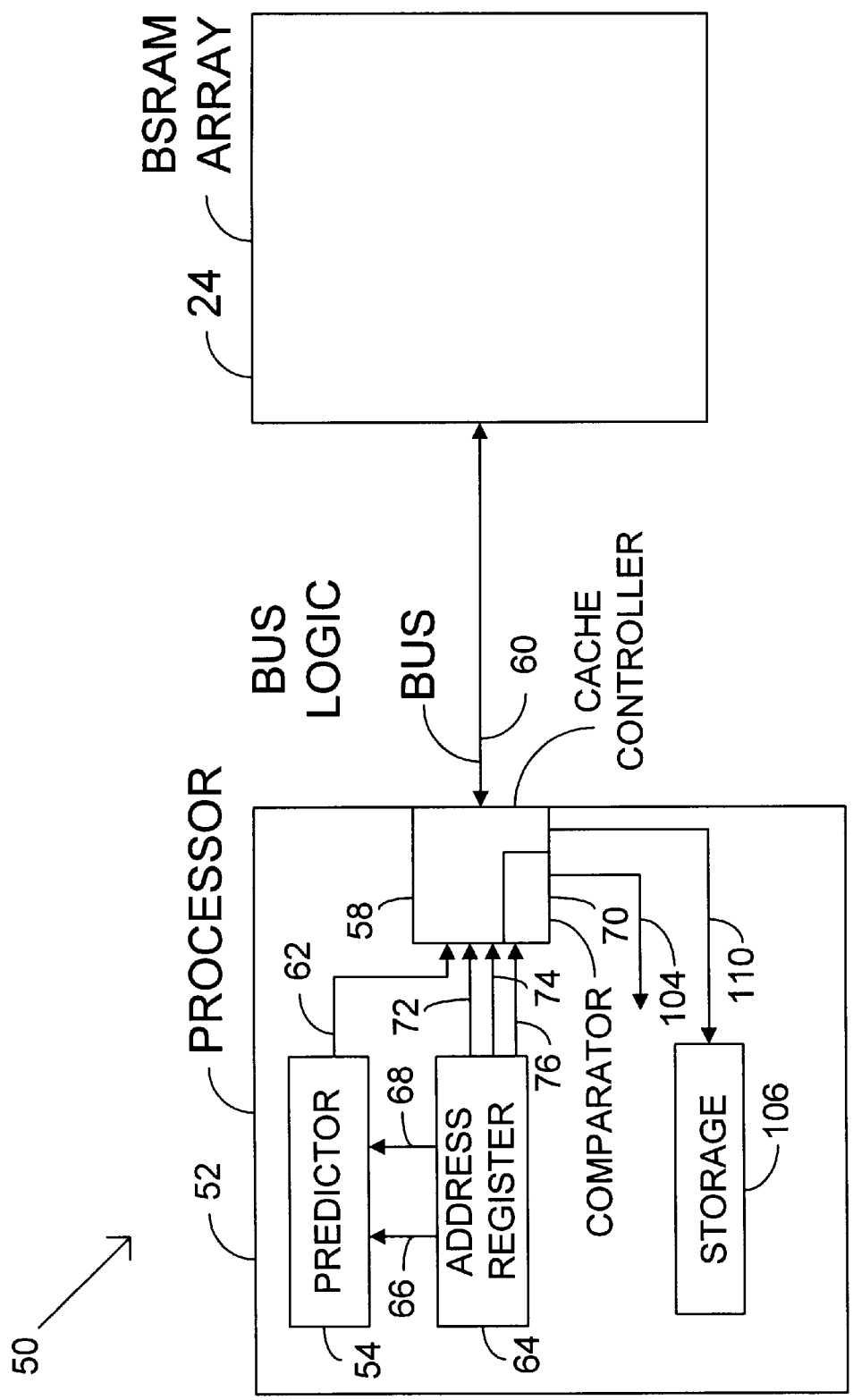
FIG. 3 is a block diagram representation of a computer system according to one embodiment of the present invention.

Referring to FIG. 3, a computer system 50 includes a processor 52 and BSRAM array 24 (shown in FIG. 2). Computer system 50 includes numerous components known to those skilled in the art, but not illustrated to avoid unnecessarily cluttering the figures and obscuring the invention. Likewise, processor 52 also includes numerous components known to those skilled in the art, but not illustrated to avoid unnecessarily cluttering the figures and obscuring the invention. In the illustrated embodiment, BSRAM array 24 is an L2 cache separated from processor 52 by a bus 60. Processor 52 is not limited to any particular kind of processor.

Tag information is distributed between a processor (e.g., processor 52) and off-processor memory (e.g., BSRAM array 24). A first portion of tag information is stored in the processor and a second portion is stored in off-processor memory. In the illustrated embodiment, the first portion of tag information is for way prediction and is called tag way information (or tag way information bits or number(s)). The first portion is not limited to way information. In the illustrated embodiment, the second portion is called remote remaining tag bits or information, but also may be referred to as additional tag information. The first portion of tag information may be locally stored tag information and the second portion of tag information may be remotely stored tag information. "Local" refers to on-processor and remote refers to "off-processor."

When processor 52 attempts to access the data address by a physical memory address, it may determine whether the data is stored in BSRAM array 24. (Some of the bits, e.g., certain least significant bits, may be ignored in addressing the data.) As used herein, data may be data, code, or other information. The physical memory address is contained in address register 64. Certain bits of the address are supplied to a predictor 54 through conductors 66 and 68. Predictor 54 predicts which of the ways (e.g., W0, W1, W2, or W3), if any, of a set in BSRAM array 24 contains the data addressed by the address of interest. Way prediction signals are supplied to cache controller 58 through conductors 62. In the illustrated embodiment, predictor 54 is a way predictor, but could be a cache line predictor if it also indicated the set in BSRAM array 24.

The address includes set information bits, a first group of address tag bits, and a second group of address tag bits. In the illustrated embodiment, the first group of address tag bits are compared with the first portion of tag information, and the second group of address tag bits are compared with the second portion of tag information. The first group of address tag bits may be called address tag way bits and the second group of address tag bits may be called additional address tag bits. In the illustrated embodiment, the first group of address tag bits comprises remaining address bits which may be contiguous, but that is not required. Likewise, in the illustrated embodiment, the second group of address bits consists of contiguous bits in the address, but that is not required.

Figure 4:
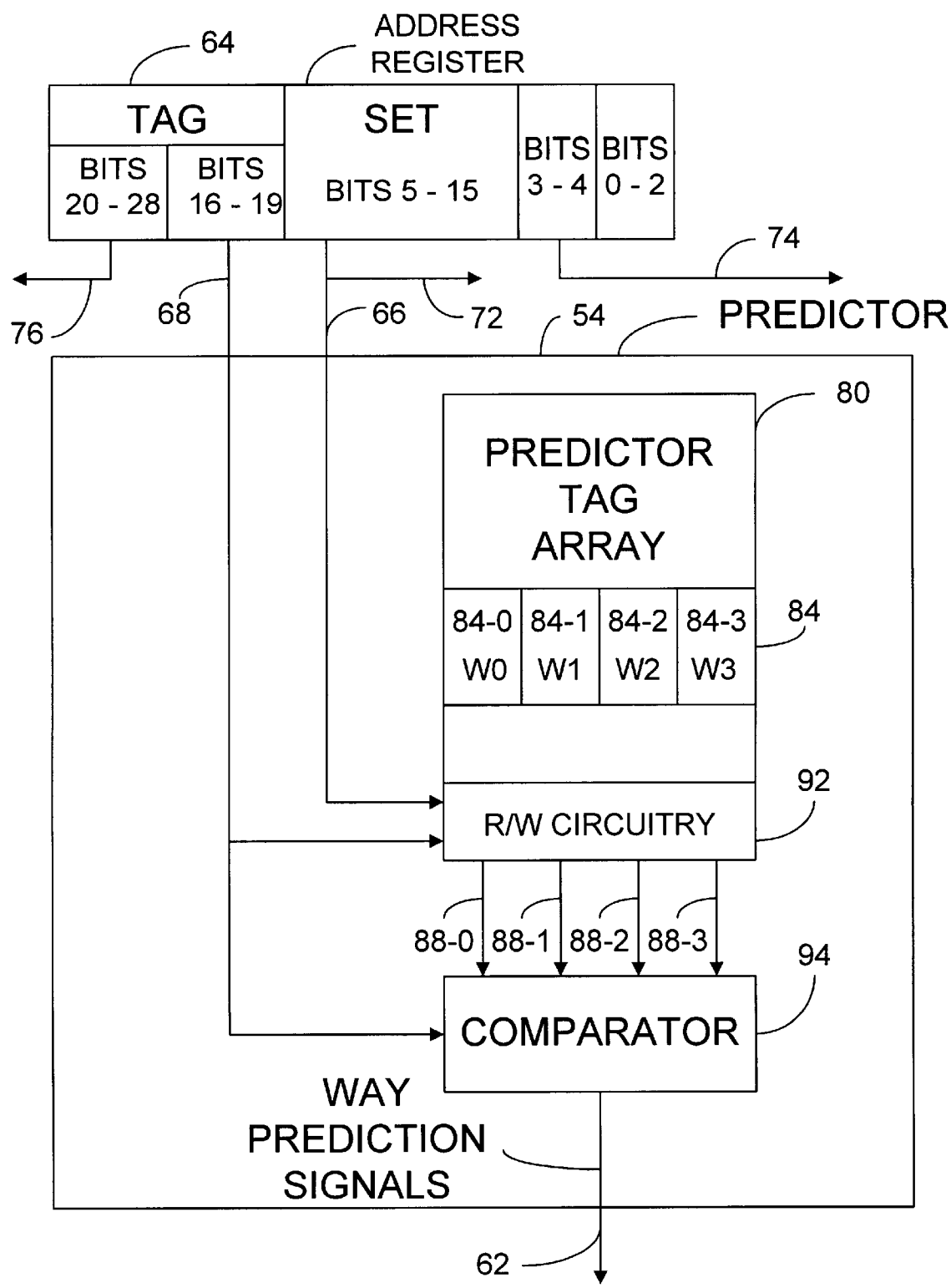
FIG. 4 is a block diagram representation of a predictor and address register of FIG. 3.

FIG. 4 provides additional details regarding a preferred embodiment of predictor 54 and use of bits of address register 64. In the illustrated embodiment, address register 64 has 29 bits and, therefore, can address 512 Meg physical addresses (where Meg=1,048,576). (In particular embodiments, there may be some addresses that do not access memory locations.) A predictor tag array 80 includes, for example, 2K sets (where K=1024) each including four tag way information numbers. There are four address way information numbers because, in the example, BSRAM array 24 is implemented in a four-way set associative arrangement. (BSRAM array 24 could be implemented in, for example, a two-way set associative arrangement.)

A particular set in predictor tag array 80 is identified by the set information bits (bits 5–15) of the address through conductor 66 to read/write circuitry 92. Set 84 is one of the 2K sets. Set 84 includes four four-bit tag way information numbers 84-0, 84-1, 84-2, and 84-3, associated with way 0 (W0), way 1 (W1), way 2 (W2), and way 3 (W3), respectively. Each of the four address way information numbers 84-0, 84-1, 84-2, and 84-3 is a four-bit number. That is the same number of bits that are included in the address tag way bits (bits 16–19) of address register 64.

When a particular set is selected by bits 5–15, the way information numbers 84-0, 84-1, 84-2, and 84-3 are provided through conductors 88-0, 88-1, 88-2, and 88-3 to comparator circuitry 94 and compared with address tag way bits (bits 16–19) of the address of address register 64. For example, assuming set 84 is selected by bits 5–15, the four four-bit numbers 84-0, 84-1, 84-2, and 84-3 are compared in comparator circuitry 94 with bits 16–19. If none of the four four-bit numbers 84-0, 84-1, 84-2, and 84-3 match bits 16–19, then there is a cache miss and processor 52 looks elsewhere for the data of interest. If only one of the four four-bit numbers match bits 16–19, then a way prediction signal (e.g., 2 bits) is provided on conductors 62 to cache controller 58 to represent the predicted way that is associated with the tag way information number matched. For example, if the four bits 84-1 match bits 16–19, then the way prediction signal on conductors 62 represents way 1. At this point, however, way 1 is only predicted. The additional address tag bits (bits 20–28) must match the remote remaining tag (or portion thereof) stored in BSRAM 24 for it to be conclusively determined that the predicted cache line is that identified by the address.

If more than one of four-bit numbers 84-0, 84-1, 84-2, and 84-3 matches bits 5–15 (called a collision), then a selection algorithm, such as a least recently used (LRU) algorithm, is used to choose the predicted way signal on conductors 62. A tag way information number that is identical to another tag way information number in a set is called an alias. In an alternative embodiment of the invention, read/write circuitry 92 does not allows aliases. The older cache line may be written over. In other embodiments, for example, only two or only three, but not four, identical four-bit tag way information numbers are allowed in a set.

Figure 5:
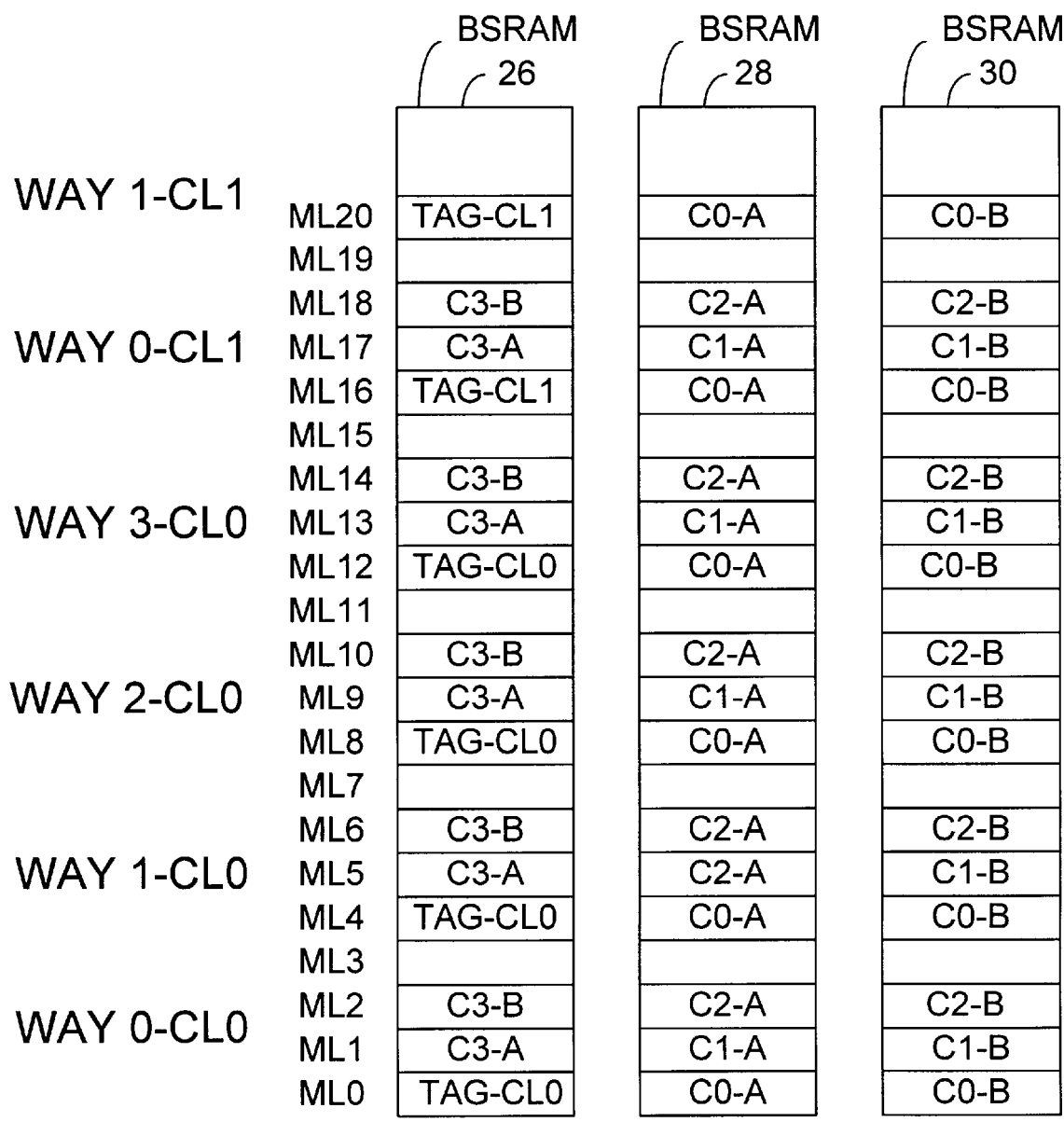
FIG. 5 is a representation of data layout of a portion of the BSRAM array of FIG. 3.

Referring to FIG. 5, BSRAMs 26, 28, and 30 are each one long bank of memory. Memory locations ML0–ML20 are shown for each. Each memory location has 4 bytes and 4 parity bits. A cache line has 32 bytes. There is a cache line for each way in a set. The data of BSRAM array 24 is implemented in four way set associative arrangement. Therefore, there are 4 cache lines per set. For example, as illustrated in FIG. 5, a first set includes a cache line CL0 for way 0, a cache line CL0 for way 1, a cache line CL0 for way 2, and a cache line CL0 for way 3. A second set includes four caches lines of which all of a cache line CL1 for way 0 and part of a cache line CL1 for way 1 are illustrated in FIG. 5.

The 32 bytes of cache line CL0 for way 0 of the first set are stored in 8 memory locations, which are ML0 of BSRAMs 28 and 29, ML1 of BSRAMs 26, 28, and 30, and ML2 of BSRAMs 26, 28, and 30. (Note that no parity bits are required to store data because 8 memory locations of 32 bits each may be used to stored the 32 byte cache line.) A 64-bit chunk 0 (C0) is formed of two 32-bit sections (half-chunks) C0-A and C0-B, stored in memory locations ML0 of BSRAMs 28 and 30. A 64-bit chunk 1 (C1) is formed of two 32-bit sections (half-chunks) C1-A and C1-B, stored in memory locations ML1 of BSRAMs 28 and 30. A 64-bit chunk 2 (C2) is formed of two 32-bit sections (half-chunks) C2-A and C2-B, stored in memory locations ML2 of BSRAMs 28 and 30. A 64-bit chunk 3 (C3) is formed of two 32-bit sections (half-chunks) C3-A and C3-B, stored in memory locations ML1 and ML2 of BSRAM 26.

Likewise, the 32 bytes of cache line CL0 for way 1 of the first set are stored in 8 memory locations, which are ML4 of BSRAMs 28 and 30, ML5 of BSRAMs 26, 28, and 30, and ML6 of BSRAMs 26, 28, and 30 in similar fashion to that of cache line CL0 of way 0. Further, as illustrated in FIG. 5, the 32 bytes of cache lines CL0 for way 2 and way 3 of the first set and cache lines for other sets are stored in similar fashion to that of cache line CL0 of way 0.

Remote remaining tag TAG-CL0 for cache line CL0 of ways 0, 1, 2, and 3 of set 1 are contained in memory locations ML0, ML4, ML8, and ML12 of BSRAM 26. In a first embodiment of the invention, each TAG-CL0 in memory locations ML0, ML1, ML2, and ML3 includes tag information for all four cache lines CL0 (i.e., for way 0, way 1, way 2, and way 3) of set 1. Accordingly, under the first embodiment, TAG-CL0 is identical in each of ML0, ML4, ML8 and ML12 of BSRAM 26. For example, for the identical 36-bit TAG-CL0 in each of ML0, ML1, ML2, and ML3, bits 0–8 are a remote remaining tag section for way 0, bits 9–17 are a remote remaining tag section for way 1, bits 18–26 are a remote remaining tag section for way 2, and bits 27–35 are a remote remaining tag section for way 3. By contrast, under a second embodiment of the invention, each TAG-CL0 is a remote remaining tag for only one cache line. For example, under the second embodiment, TAG-CL0 in memory location ML0 would be a 9 bit number containing tag information for only cache line CL0 of way 0; TAG-CL0 in memory location ML4 would be a 9-bit number containing tag information for only cache line CL0 of way 1; and so forth. Therefore, under the second embodiment, the four TAG-CL0 in ML0, ML4, ML8, and ML12 may be, but are not required to be, different from each other.

Referring to FIGS. 4 and 5, there are 9 address bits (bits 20–28) in the second group of address tag bits in the address of address register 64. Under the first embodiment, TAG-CL0 would include 36 bits (4×9 bits). Therefore, all 32 bits plus the 4 parity bits of each of memory locations ML0, ML4, ML8, and ML12 would be used to store the four identical 36-bit TAG-CL0s. Under the second embodiment, only 9 bits of each location ML0, ML4, ML8, and ML12 of BSRAM 26 would be needed.

If more than 9 address tag bits are used, a 36 bit memory location (32+4 bits) would not be able to hold a TAG-CL0 that includes tag information for four cache lines. In such a case, the second embodiment could be used. Alternatively, a third embodiment, in which the memory locations held tag information for, for example, only two cache lines could be employed. In a two-way set associative embodiment, there would not be such stringent constraints. More than 9 address tag bits in the second group of address tag bits may be used where the address has for example, 30 or more bits.

Predictor 54 and cache controller 58 predict which cache line is addressed by the address of address register 64 based on which tag way information numbers of predictor tag array 80 match address tag way bits 16–19 and on the set specified by address set bits 5–15. The remote remaining tags in BSRAM array 24 that are identified by the set and way are provided through bus 60 to a comparator 70 in cache controller 58. The address set bits (bits 5–15) are provided to cache controller 58 through conductors 72 and used by cache controller 58 to select one of the sets of BSRAM array 80. The way prediction signal on conductor 62 is used by cache controller 58 to select one of the ways of the selected set. The remote remaining tags (e.g., TAG-CL0) for the predicted set are read by cache controller 58 and compared with the second group of address tag bits (bits 20–28) in comparator circuitry 70. The second group of address tag bits are provided to comparator 70 through conductors 76. Where TAG-CL0 is identical for all four ways, the second group of address tag bits (bits 20–28) may be compared against all four sections of TAG-CL0 or only against the section of TAG-CL0 corresponding to the predicted way.

If there is a match between the remote remaining tag and the second group of address tag bits, then the cache line of the predicted set and way is the cache line that corresponds to the address in address register 64. If there is not a match, the correct cache line may be in another way of the selected set (assuming there is a match between address tag way bits and tag way information number in predictor 54). The remote remaining tag or portion thereof for the other ways may be compared to determine if there is a match.

Figure 1:
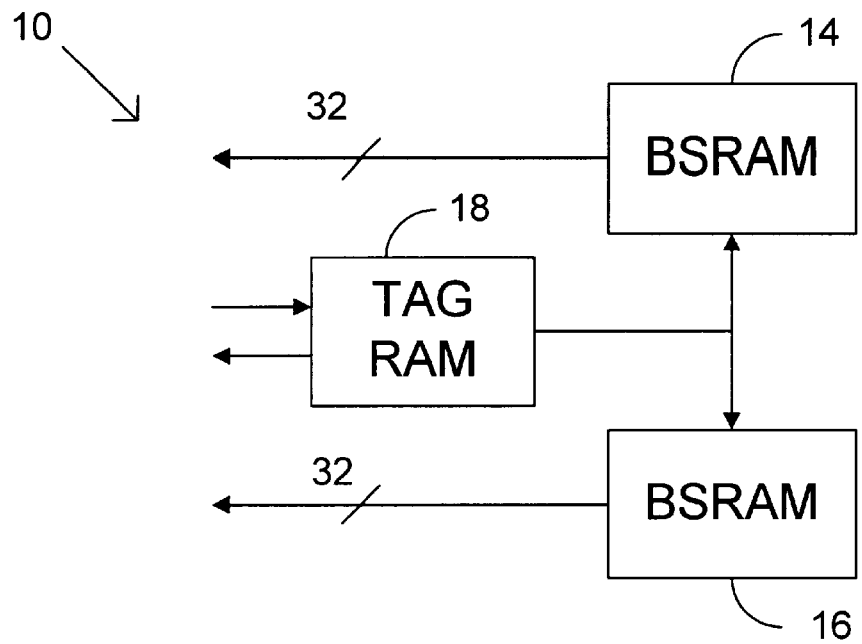
FIG. 1 is a block diagram representation of a prior art cache memory array including a Tag RAM component.
Figure 6:
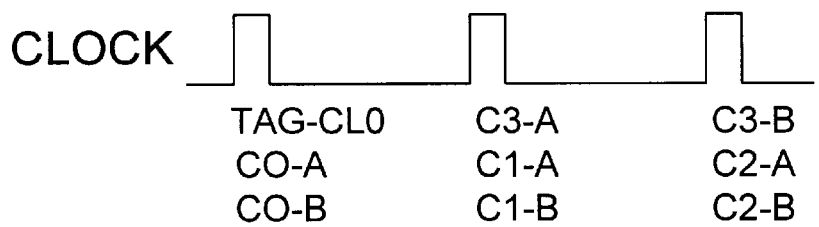
FIG. 6 is a timing diagram showing chunks that can be read from the BSRAM array in three data bus bursts during three clock cycles.

Referring to FIG. 6, in one embodiment of the invention, remote remaining tag TAG-CL0 is read first, along with half-chunks C0-A and C0B, during a first data burst clock cycle. Half-chunks C3-B, C1-A, and C1-B are read during a second data burst clock cycle. Half-chunks C3-B, C1-A, and C1-B are read during a third clock cycle. (By contrast, in the prior art cache of FIG. 1, it would take four data burst clock cycles.) Half-chunks C0-A, C0-B, C3-A, C1-A, C1-B, C3-B, C2-A, and C2-B are provided to storage 106 through conductors 110. By reading the remote remaining tag TAG-CL0 first, the comparison in comparator 70 can be made while all or part of the remaining half-chunks are being read and stored in storage 106. If the prediction was correct, then the desired cache line formed of the half-chunks in storage 106 is available at or shortly after completion of the comparison. If the prediction was incorrect such that there is not a match in comparison circuitry 70, then the half-chunks in storage 106 are simply ignored. The results of the comparison of comparator circuitry 70 is may be made available on conductors 104.

An advantage of the first embodiment (in which each of the remote remaining tag in a set are identical) occurs in the case in which there is more than one match in comparator circuitry 94, but the incorrect way is predicted. For example, suppose that 4-bit sections 84-1 and 84-2 each matched the address tag way bits (bits 16–19). Further suppose that comparator circuitry 94 selected way 1 although way 2 actually held the cache line designated by the address in address register 64. Comparator circuitry 70 would compare all four sections of a remote remaining tag (e.g., TAG-CL0) with second group of address tag bits (bits 20–28). The comparison of the various sections with the second group of address tag bits may be simultaneous or sequential. In the example, the bits in the section corresponding to way 1 would not match, but the bits in the section corresponding to way 2 would match. Therefore, the half-chunks corresponding to way 2 could be read. The correct cache line would be read faster if the correct way is predicted. However, in the case in which the correct way is not predicted, then the correct cache line can be read in fewer clock cycles with the identical remote remaining tags than if each remote remaining tags were read separately from BSRAM array 24.

It may be observed from FIG. 5, that in the illustrated embodiment, one memory location for each BSRAM 26, 28, and 30 and for each way is not used as part of a cache line. In an alternative embodiment, all memory locations could be used. However, in the illustrated embodiment, every fourth memory location (e.g. ML3, ML7, ML11, etc.) is not used because it is simpler to address with powers of two. Also, the memory locations not used for cache lines may be used for other purposes such as for context switching. For example, if computer system 50 switch from a word processor to a spread sheet program, certain portions of the word processor program could be stored in the memory locations not used for cache lines. Such memory locations may be accessed through prediction or through the actual addresses without prediction.

Bits 3 and 4 may be supplied on conductors 74 to cache controller 58 to specify the order of chunks in a cache line. The arrangement of half-chunks and remote remaining tags in BSRAM array 24 of FIG. 5 is only one of many ways in which they could be organized. The invention is not limited to the particular arrangement of FIG. 5.

Regarding BSRAM array 24, to the extent there is a performance advantage to provide a particular data chunk first, attention should be paid to lay the data item out carefully in BSRAM array 24 to minimize latency. In layout of FIG. 5, there is little or no latency penalty unless perhaps if the access address starts at the last 8 bytes of the cache line. In some embodiments, assuming a scenario that address distribution is totally random, there may be an average 0.5 clock of latency penalty.

Additional Information and Embodiments

Many variations in the various circuitry of the illustrations will be apparent to those skilled in the art having the benefit of this disclosure. For example, the various logic circuits illustrated herein may be replaced with other logic circuits that perform the same functions. The general functions of the invention may be performed by significantly different circuitry. Further, the circuitry may include dedicated hardware or be responsive to software or firmware control. Processor 52 is not limited to any particular kind of processor. The various components (e.g., predictor tag array 80, read/write circuitry 92, comparator circuitry 94, and cache controller 58) may be constructed or fabricated with well known materials according to well known processes.

There may be intermediate structure (such as a buffer) or signals that are between two illustrated structures. Some conductors may not be continuous as illustrated, but rather be broken up by intermediate structure. The borders of the boxes in the figures are for illustrative purposes. An actual device would not have to include such defined boundaries. The relative size of the illustrated components is not to suggest actual relative sizes.

Upon a write request, the tags of the set may be read out to determine if there is a match. If so, the cache line may be written into BSRAM array 24 in three data bursts. Note that, if the cache hierarchy is inclusive, the first level cache miss logic can provide the way bit along with the address. This allows the line to be written directly without needing a tag inquire first.

Upon a snoop request, the tag of the set may be read out first. The appropriate cache line state may be written into BSRAM array 24 based on the outcome of the tag comparison. In another embodiment, the state can be stored on the processor die to minimize the snoop latency.

The number of bits in the address way information numbers and in the address tag way bits could have been a number other than 4. There is a size/cost trade off in the number of bits. For numbers greater than 4, there is an increase in both size of predictor 54 and accuracy of prediction. For number less than 4, there is a decrease in both size and accuracy of prediction. There should be at least 2 bits for a four way set associative cache.

Depending on the circumstances, there may not be much increase in predictability with an increase of 4 to 5 bits or 5 to 6 bits.

The predictor may be a simple most recently used (MRU) way predictor, similar to that which has been employed in the prior art MIPS 10000, but with the addition of tag information. A more efficient way predictor, such as an efficient 2-bit like way predictor, such as is described in U.S. Pat. No. 5,548,742 to Wang et al., may also be used with tag information. However, it is understood that neither the MRU way predictor of the MIPS 10000 nor the way predictor of U.S. Pat. No. 5,548,742 included tag information in the way predictor.

In an inclusive cache hierarchy, a data cache unit (DCU) may be used to store the L2 way bits to optimize the write performance. The amount of logic and stored needed is very minimal: two bits per DCU cache line and two bits routing for writeback address. When L2 provides a line to DCU, it indicates which way the line is located in L2. The DCU simply stores away this bit and uses it when the line needs to be written back to L2 later.

The invention is not limited to BSRAM components having 32-bit data storage with 4 parity bits. The cache does not have to be comprised of BSRAM components. In can be comprised of high speed DRAM components as well. The BSRAM or memory components do not have to be commodity components. By commodity it is meant that the component meeting certain standards is available from various sources. Further, the invention is not limited to using three commodity BSRAM or other memory components.

Where a single conductor is illustrated or described, it may be replaced by parallel conductors. Where parallel conductors are illustrated or described, they may be replaced by a single conductor.

For systems with inclusive cache hierarchy, a first level data cache may be tagged with L2 way bits to simplify cache line write to L2.

Only one comparator circuitry is necessary. For example, either of comparator circuitry 70 or comparator circuitry 94 could perform the comparisons performed by both illustrated comparator circuitry 70 and 94.) One set of circuitry may select the set in both BSRAM array 24 and predictor tag array 80 rather than having selection circuitry in both read/write circuitry 92 and cache controller 58. Predictor 54 could be considered part of cache controller 58.

The term "connected" and related terms are used in an operational sense and are not necessarily limited to a direct connection. For example, address register 64 is connected to prediction tag array 80 through conductors 66 and read/write circuitry 92. The term "responsive" and related terms mean that one signal or event is influenced to some extent by another signal or event, but not necessarily completely or directly.

If the specification states a component "may", "could", or is "preferred" to be included, that particular component is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A computer system, comprising:
   an on-processor predictor tag array to contain first portions of tag information for multiple ways and multiple sets;
   an off-processor cache memory including memory locations to store data and second portions of tag information; and
   comparison circuitry to make a first comparison of a first portion of an address with the first portions of tag information for the ways of one of the sets and to use results of the first comparison in predicting which of the ways, if any, correspond to the address, and to make a second comparison of a second portion of the address with sections of the second portions of tag information identified by the predicted way and the address.

2. The system of claim 1, wherein the first comparison includes multiple comparisons and may yield more than one way as a possibility.

3. The system of claim 2, wherein the comparison circuitry performs an algorithm to select one of the possible ways.

4. The system of claim 1, wherein the cache memory is formed of commodity RAM components and the second portions of tag information are stored in the commodity RAM components.

5. The system of claim 4, wherein the RAM components are burst static random access memory (BSRAM) components.

6. The system of claim 1, wherein the cache memory includes three burst static random access memory (BSRAM) components that contain the second portions of tag information.

7. The system of claim 1, wherein there are four ways.

8. The system of claim 1, wherein the comparison circuitry is on the processor.

9. The system of claim 1, wherein the comparison circuitry includes a first comparator to make the first comparison and a second comparator to make the second comparison.

10. The system of claim 1, wherein the first portions of tag information are tag way information bits.

11. The system of claim 1, wherein the second portions of tag information are remote remaining tag bits.

12. The system of claim 1, wherein the off-processor cache memory includes memory locations that stored context information rather than cache lines.

13. The system of claim 1, wherein the comparison circuitry makes a cache line prediction.

14. A computer system, comprising:

an on-processor way predictor including a predictor tag array to contain first portions of tag information for multiple ways and multiple sets;

an off-processor cache memory including commodity burst static random access memory (BSRAMs) having memory locations to store data and second portions of tag information; and comparison circuitry to make a first comparison of a first portion of an address with the first portions of tag information for the ways of one of the sets and to use results of the first comparison in predicting which of the ways, if any, correspond to the address, and to make a second comparison of a second portion of the address with sections of the second portions of tag information identified by the predicted way and the address.

15. The system of claim 14, wherein the first comparison includes multiple comparisons and may yield more than one way as a possibility.

16. The system of claim 15, wherein the comparison circuitry performs an algorithm to select one of the possible ways.

17. The system of claim 14, wherein the comparison circuitry is on the processor.

18. The system of claim 14, wherein the comparison circuitry includes a first comparator to make the first comparison and a second comparator to make the second comparison.

19. The system of claim 14, wherein the first portions of tag information are tag way information bits.

20. The system of claim 14, wherein the second portions of tag information are remote remaining tag bits.

21. The system of claim 14, wherein the off-processor cache memory includes memory locations that stored context information rather than cache lines.

* * * * *